United States Patent [19]

Brown et al.

[11] Patent Number: 5,681,094
[45] Date of Patent: Oct. 28, 1997

[54] SEAT BELT MECHANISM FOR A CHILD SEAT

[75] Inventors: Doyle Eugene Brown, Rochester; Gregory Allen Polsgrove, Farmington; Kirk Edward Morris, Davisburg, all of Mich.

[73] Assignee: Takata Inc., Auburn Hills, Mich.

[21] Appl. No.: 616,571

[22] Filed: Mar. 15, 1996

[51] Int. Cl.6 .................... A47D 15/00; A62B 35/00; B60R 22/34; B60R 22/48
[52] U.S. Cl. ............................................ 297/484
[58] Field of Search ............................ 297/484; 188/30

[56] References Cited

U.S. PATENT DOCUMENTS

| | | | |
|---|---|---|---|
| 3,887,233 | 6/1975 | Garayaglia et al. | 297/484 X |
| 4,790,601 | 12/1988 | Burleigh et al. | 297/484 |
| 5,398,997 | 3/1995 | McFalls | 297/484 X |
| 5,468,046 | 11/1995 | Weber et al. | 297/484 X |
| 5,503,461 | 4/1996 | Schreier | 297/484 |

*Primary Examiner*—Peter M. Cuomo
*Assistant Examiner*—Rodney B. White
*Attorney, Agent, or Firm*—Fitch, Even, Tabin & Flannery

[57] ABSTRACT

An easy-to-use seat belt mechanism is provided for use with a child seat and includes a seat belt retractor having a reel with a seat belt wound thereon which can be extended about a child in the child seat. A pawl and ratchet form a retractor mechanism for blocking rotation of the reel and seat belt protraction to restrain the child in the seat. A manually rotatable shaft is connected to the reel to wind the reel in a rewind direction to tighten the seat belt about the child and provide an accurate sensation of increasing belt tension on the child. A manually operable release is operable to disable the pawl and ratchet mechanism to allow protraction of the belt with rotation of the reel and thereby allowing removal of the child from the child seat. The release also allows the belting to be readily readjusted if the belt is not properly tightened about the child.

15 Claims, 5 Drawing Sheets

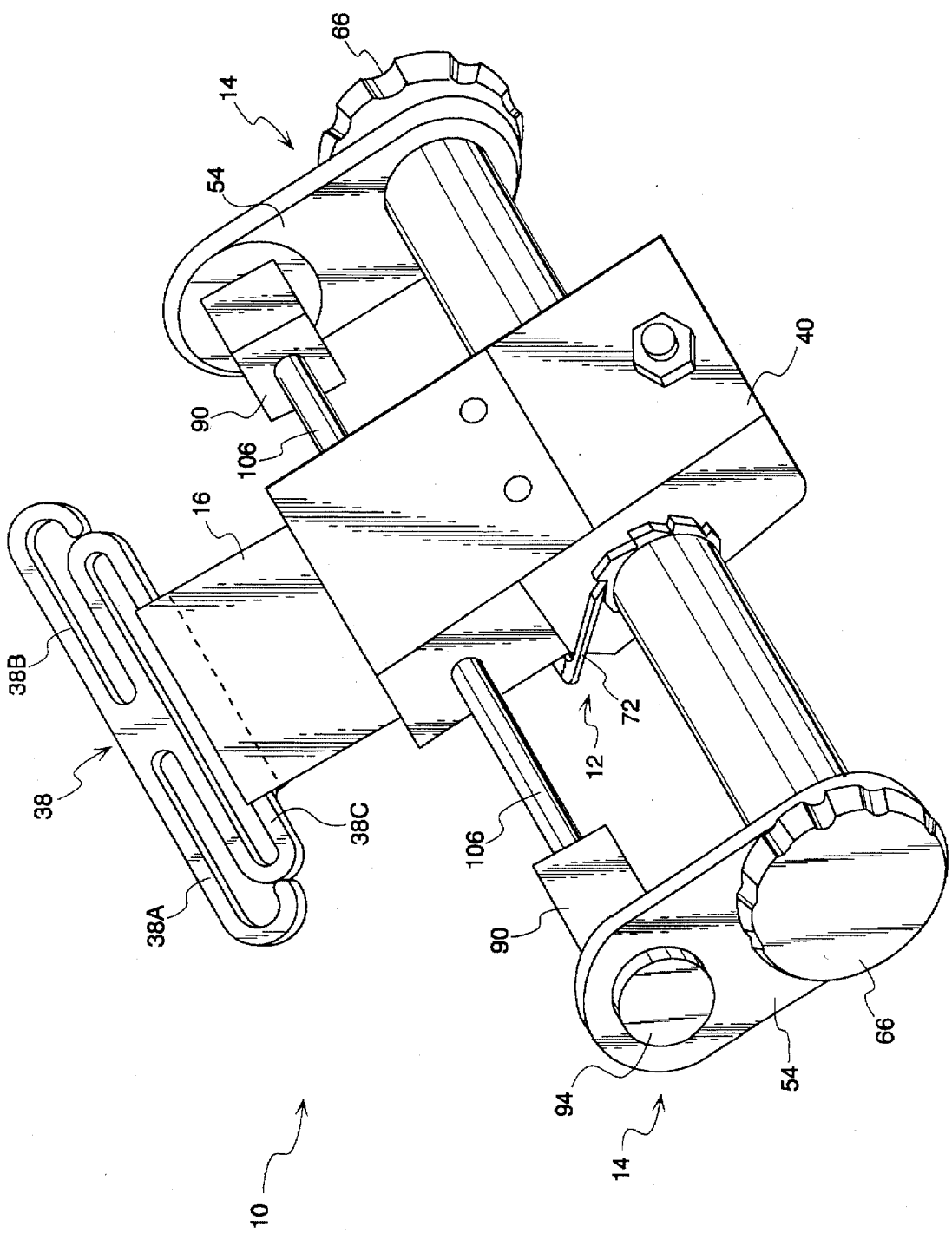

SEAT BELT MECHANISM FOR A CHILD SEAT

FIELD OF THE INVENTION

This invention relates to a seat belt mechanism for use with a child seat providing for ready seat belt adjustability and, more particularly, to a seat belt mechanism for use with a child seat where the user can accurately control and adjust the tension placed on the seat belt about the child and easily release the tension from the seat belt for readjusting the seat belt about the child.

BACKGROUND OF THE INVENTION

Child seats typically are distinct seating units for small children and can be either permanently integrated in an automobile or removably secured on the seat in an automobile to allow a child to be safely transported therein. Typically, these child seats incorporate some sort of shoulder harness structure utilizing belting to restrain the child seated in the child seat.

In some of the currently-available child seats, the shoulder strap harness belting is connected behind the seat to a splitter plate which has a single strap attached at one of its ends to the plate and at its other end to a reel underneath the seat. The reel can incorporate an auto-lock feature which allows the user to pull on the shoulder strap to unwind webbing from the spool. However, once the strap is released as by discontinuing the unwinding pulling action on the shoulder straps, the auto-lock feature kicks in to lock the straps in place about the child. One problem which arises with auto-lock features is that when a mistake is made and the harness straps are either tightened too tightly or too loosely about the child, the child must be removed from the seat with the straps being allowed to fully retract to a full reel to restart the entire shoulder strap fitting process. Also, if the child is wearing heavy clothing, such as a winter jacket or the like, the auto-lock mechanism will not take up enough of the belting before locking thereby producing slack in the shoulder straps and not properly restraining the child in the seat. In addition, during use, it is typical for the child to move and shift in the child seat which allows the belting to further retract onto the reel to take up the available slack and thereby further tighten the shoulder straps potentially producing uncomfortable levels of tension on the shoulder strapping about the child.

Many child seats utilize shoulder straps which extend through a pair of vertically aligned slots in the upper backrest portion of the child seat. At one end the straps are secured at the rear of the backrest and at their other end the shoulder straps can have a tongue plate which latch into a seat belt buckle in front of the backrest with the seat belt buckle being connected by a lower middle strap to the seat rest. Several pairs of vertically aligned slots may be provided with the aligned pairs being vertically spaced from each other to provide for belting size adjustment as the child grows.

There are a variety of means provided at the rear of the backrest in the above-described shoulder straps for allowing some adjustment of the straps extending through the backrest aligned slots. For example, one commercially available child seat utilizes shoulder straps with each strap having a pair of loops formed at different positions near the strap end extending through the backrest to provide for some adjustment on the amount of strap extending out from the front of the backrest for connecting to the belt buckle. To adjust the amount of shoulder strap material extending forward of the backrest, an adjustment bar must be removed from one pair of loops and then inserted through the other pair of corresponding loops on the straps with the adjustment bar then being re-secured against the rear of the backrest. As is apparent, the above-described child seat only allows for adjustment between two positions and, as such, does not provide for precise control over a range of different tensions which is particularly desirable to allow the child seat to be effectively and safely used with comfort as a child grows, with different children of varying sizes, and with varying thicknesses of clothing on a child. In addition, adjusting the straps in these prior child seats is an involved procedure as the rear adjustment is not readily accessible and can be time consuming which is particularly undesirable with child seats as any parent will readily appreciate, particularly when attempting to seat an antsy or upset child moving about in their child seat. Moreover, with integrated child seats, the rear of the backrest usually will not be accessible and, accordingly, rear adjustment thereof will not be readily practical. Thus, there is a need for a child seat having a seat belt mechanism which is easier to adjust and provides more exact control over a wide range of tensioning on the belting about the child.

It is known to use a cinch mechanism which allows the harness straps to be pulled to draw the shoulder straps tight about a child. Typically, the shoulder straps extend through the backrest to the previously-described splitter where a single strap is attached and extends out from underneath the seat rest through the cinch mechanism. The cinch mechanism has a cinch plate lever which can be pivoted down to engage and cinch the single strap thereby locking the shoulder straps about a child.

To tighten the straps about a child, the child is placed in the seat with the tongue plates of the straps being inserted in the buckle. With the cinch lever pivoted up, the single strap is pulled to draw the shoulder straps tight about the child. Once the desired tightening is achieved, the cinch lever is pivoted down to lock the shoulder straps about the child. For removing a child from a seat and/or correcting for any mistakes in the tensioning process when placing a child in the seat, the cinch lever is pivoted up to release the single strap and allow for pulling out of the shoulder straps. The requirement that the single strap be pulled to exert the desired amount of tension on the child in the seat is undesirable in that it is difficult to accurately feel the amount of tension placed on the shoulder strap belting about the child. Thus, there is a need for a seat belt mechanism for use with a child seat which is easy to use and provides for more exact feel of the amount of tension placed on the belting about the child in the child seat.

SUMMARY OF THE INVENTION

In accordance with the present invention, an easy-to-use seat belt mechanism is provided for use with a child seat which more readily allows the tension on the belting about the child to be controlled and accurately adjusted without requiring the tensioning process to be repeated if the tension in the belt is not appropriately adjusted. In addition, the seat belt mechanism herein allows for a highly accurate feel of the tension on the shoulder straps as they are tightened about the child.

In one form of the present invention, the seat belt mechanism includes a seat belt retractor having a reel with a seat belt wound thereon which can be extended about a child in the child seat. A pawl and ratchet form a retractor mechanism for blocking rotation of the reel and seat belt protraction to restrain the child in the seat. A manually rotatable shaft is connected to the reel to wind the reel in a rewind direction to tighten the seat belt about the child. A manually operable release is operable to disable the pawl and ratchet mechanism to allow protraction of the belt with rotation of the reel and thereby allowing removal of the child from the child seat.

Thus, to secure a child in the child seat herein, the release can be operated and the shoulder straps of the seat belt can be pulled to provide some slack in the shoulder straps and comfortably allow the child to be placed in the seat. Then, the manually rotatable shaft is rotated until the seat belt shoulder straps are tightened to their desired tension on the child. Manual rotation of the shaft will start to become more and more difficult thereby allowing a user to feel the tension on the belt progressively increasing as it tightens on the child, unlike prior seat belt mechanisms which required the user to pull on a single strap to draw the shoulder belt straps tight about the child. In addition, if either too much slack is left in the belt or the belt is tightened with too much tension on the child, the release can be readily manually operated to disable the retractor mechanism and allow the belting to be readjusted to the desired tension. Once the desired tension is achieved, subsequent movement by the child will not cause the tensioning to change as with seat belt mechanisms in child seats utilizing the previously-described auto-lock feature.

In a preferred form, the manually operable release includes a push button that is pushed to disable the pawl and ratchet mechanism. The push button operation of the manually operable release provides for a much simpler and easier-to-operate release mechanism over the child seats using an auto-lock feature where the belt webbing had to be allowed to retract to a full reel before the belting could once more be protracted from the reel to a locked position about a child. The push button is also an improvement over the cinch mechanisms using the pivoting plate as the plate requires a user to exert an upward releasing force on the lever plate to pivot it out of cinching engagement with the belt. For locking the belt in place, the user has to exert an opposite downward locking force on the lever plate sufficient to cinch the belt. On the other hand, the push button requires much less effort as a user need only push the bottom head against a bias force to release the tension on the belt and allow protraction thereof. The user can then remove their finger from the button so it rebounds back to its retraction-only position thereby allowing the belt to be further tensioned until tightened sufficiently.

The manually operable release can include a pawl actuator connected to the pawls of the pawl and ratchet mechanism to lift the pawls from blocking engagement with the ratchet wheels to a release position. A cam may be operable by the push button for camming the actuator to its release position. The reel can be mounted on the manually rotatable shaft with a knob attached to the end of the shaft for manual rotation of the shaft and reel thereon. Thus, with the seat belt mechanism herein, a user only has to turn the knob to increase the tension on the seat belt around the child. As the tension on the belt increases, the user will get a corresponding sensation of the increasing belt tension as the knob becomes more difficult to turn and operate. This provides the person winding the reel with the knob with a highly accurate perception of the amount of belt tightening force being placed on the child by the belt, contrary to prior systems requiring a strap to be pulled on to draw the shoulder belts tight about the child.

A pair of rotatable shafts connected to the reel can be provided with rotatable knobs for rotation of the shafts and push buttons for the manually operable release on both sides of the child seat. This allows for control over the seat belt mechanism from either side or from both sides, such as when the shaft is rotated too far and the release must be operated for loosening the tension of the belt on the child. With the inventive seat belt mechanism, a user can operate the rotatable knob on the one side of the seat with one hand until the desired tension is achieved and, if exceeded, with their other hand they can push the push button on the other side of the seat to release the excessive tension on the belt. The push button can then be released to allow it to rebound back to its inoperative position, thereby locking tension on the belt at the desired level and allowing belt tension to be increased, if desired.

In another form of the invention, the seat belt mechanism includes a seat body with a seat rest and a backrest and a pair of sides on the backrest. The seat belt mechanism is mounted on the seat body and includes a reel with a seat belt wound thereon for extending about the child. A pawl and ratchet mechanism is connected to the reel for releasably blocking protraction of the seat belt to restrain the child in the child seat. A manually rotatable shaft is mounted in the seat body and connected to the reel to rotate the reel and to tighten the seat belt about the child. A manually operated release on the seat body is operable to disable the pawl and ratchet mechanism to allow protraction of the seat belt and rotation of the reel and removal of the child from the child seat.

In one form, a pair of shoulder straps of the seat belt extend along the backrest with the lower ends fastened to the seat body. A single strap is wound on the reel and connected to the shoulder straps behind the seat rest of the child seat body. Thus, with the child seat herein, both shoulder straps are adjusted together to provide for equal seat belt tension on either side of the child in contrast to prior child seats which require the shoulder straps to be individually adjusted. With the inventive seat belt mechanism, the winding of the single strap on the reel at one end and at its other end connected to the shoulder straps allows rotation of the reel to simultaneously tighten both shoulder straps to substantially equal tensions on the child.

BRIEF DESCRIPTION OF THE DRAWINGS

FIG. 1 is a perspective view of a seat belt mechanism for use with a child seat according to the present invention;

DETAILED DESCRIPTION OF THE PREFERRED EMBODIMENT

In FIG. 1, a seat belt mechanism 10 is illustrated having a retractor 12 and seat belt controls 14 according to the present invention. In a preferred form, the retractor 12 and seat belt controls 14 are operable to tension or to release tension on a single short strap 16 extending from the retractor 12.

Figure 3:
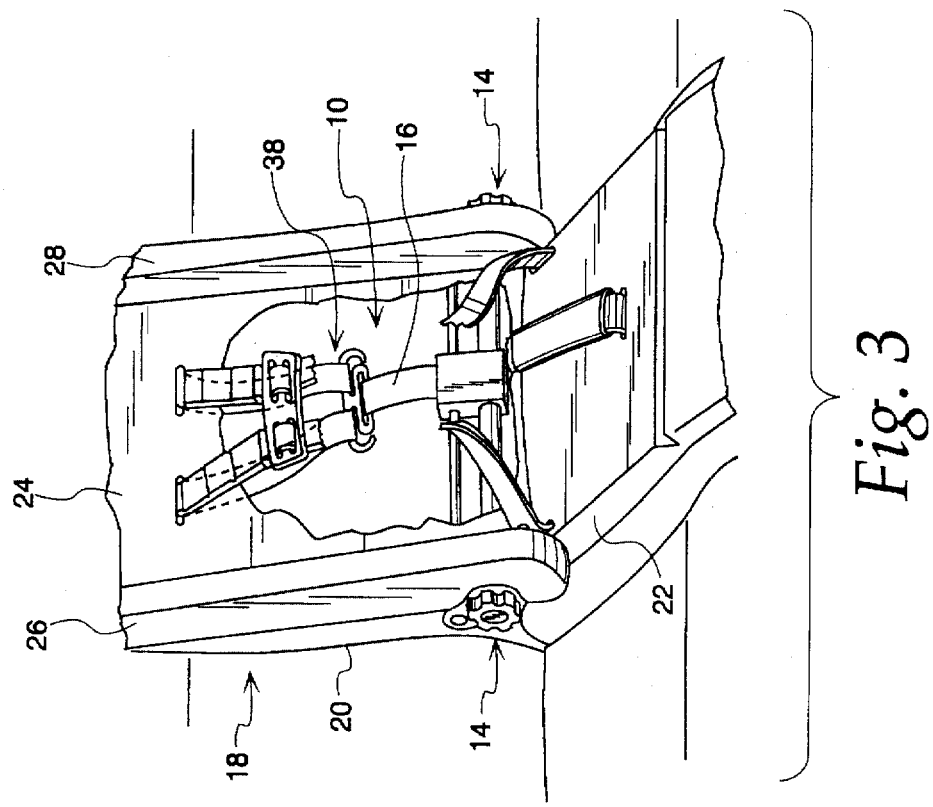
FIG. 3 is a perspective view of the integrated child seat of FIG. 2 with a portion of the backrest broken away to show the seat belt mechanism in the seat body.
Figure 2:
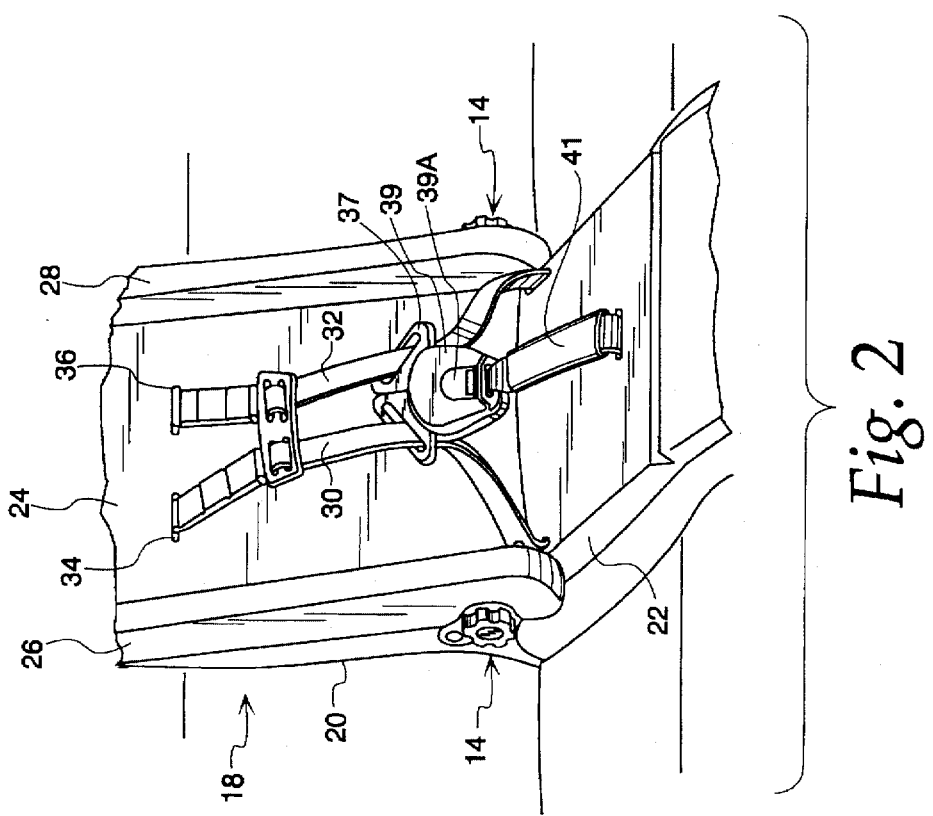
FIG. 2 is a perspective view of the seat belt mechanism of FIG. 1 mounted in an integrated child seat showing two shoulder straps extending into the top of the child seat backrest and the control knobs and push buttons on either side of the seat.

Referring to FIGS. 2 and 3, the seat belt mechanism 10 is illustrated in its operative position mounted to a child seat 18. In the preferred and illustrated form, the child seat 18 is permanently attached to be integrated in an automobile. The child seat 18 can be of conventional construction in that it can include a seat body 20 having a seat rest 22, a backrest 24 and a pair of laterally spaced upright side members 26 and 28 on either side of the backrest 24. Preferably, the seat belt mechanism 10 is mounted in the lower part of the seat body 20 behind the backrest 24 with the seat belt controls 14 mounted on the lower outside of the side members 26 and 28.

The child seat 18 has a pair of shoulder harness strap portions 30 and 32 which preferably are part of a single long length of belting with the shoulder straps 30 and 32 extending out from two upper laterally spaced slots 34 and 36 formed in the upper part of the backrest 24. The shoulder straps 32 extend down behind the backrest 24 and are attached to a connecting element 38 which, in turn, is connected to the single strap 16 wound in the retractor 12. The shoulder strap portions 30 and 32 extend under the seat rest 22 near the juncture of the seat rest 22 with the backrest 24 where they meet and join as part of the single long belt. Thus, as described above, one long single piece of belting can be used to form the two looped shoulder strap portions 30 and 32 which can be tightened about a child.

The shoulder strap portions 30 and 32 can extend through a slotted member 37 attached to a seat belt buckle 39. A lower middle strap 41 can be attached in the seat rest 22 at one end and at its other to the buckle 39 by way of a tongue plate (not shown). With the lower strap 41 connected to the buckle 39 and to either seat a child in the child seat 18 or remove a child therefrom, a push button 39a is pressed to remove the strap tongue plate from the buckle 39. The buckle 39 and associated slotted member 37 can be slid upwardly along the shoulder straps 30 and 32 to allow for child access to or removal from the seat 18. To seat and secure the child in the seat 18, the buckle 39 is brought back down over the child with the middle strap 41 extending between their legs which is then connected to the buckle 39, as previously described. Thereafter, operation of the controls 14 can either wind the single strap 16 into the retractor 12 to thereby tighten the shoulder straps 30 and 32 about the child, or can allow the strap 16 to be protracted from the retractor 12 such as by pulling on the shoulder straps 30 and 32 to loosen them off the child. As will be apparent, the provision of the controls 14 provides the user with an improved ability to regulate the amount of tightening or tension in the shoulder straps 30 and 32 on a child seated in the child seat 18 over prior child seats using seat belt mechanisms incorporating auto-lock features or requiring the short strap to be directly pulled upon until the desired shoulder strap tightening has been achieved.

More specifically and referring to the illustrated embodiment in FIGS. 4–7, the preferred structure of the retractor 12 and controls 14 therefor will be more fully described. The retractor 12 has a housing 40 containing a reel device 42 including a reel shaft 43 for winding of the short strap 16. The housing 40 has side plates 44 and 46 with the reel shaft 43 extending between and through the side plates 44 and 46 to the exterior of the retractor housing 40. A pair of manually rotatable shafts 50a and 50b are mounted to a pair of corresponding mounting members 52, one of which is illustrated in the Figures. The shafts 50a and 50b are journalled for rotation at one end in a flat plate portion 54 of the mounting member 52 and can be journalled for rotation at their other end in respective side plates 44 and 46 of the retractor housing 40.

Rotation of either one of the shafts 50a and 50b can drive the reel shaft 43 by way of cooperating ratchet wheel 56 and drive disc 58. More specifically, ratchet wheel 56 is mounted for rotation with rotatable shaft 50a outside the retractor housing 40 adjacent the side plate 44. Similarly, drive disc 58 is mounted for rotation with the shaft 50b outside the retractor housing 40 adjacent the side plate 46. The reel shaft 43 can be in the form of a bolt shank 48 on which the ratchet wheel 56 and drive disc 58 are mounted clamped between a nut 59 screwed on the threaded end 48a of shank 48 and bolt head 48b at the other end of the shank 48, respectively, as best seen in FIGS. 4 and 5.

The drive disc 58 extends into the interior of drive shaft 50b where it has a pair of radially spaced, axially extending projections 60 and 62 which extend from the plane of the drive disc 58. The spacing between projections 60 and 62 is such that the drive disc can be press fit onto a hub member 64 of the reel 42. In other words, the projections 60 and 62 are spaced at a distance substantially the same or slightly smaller than the diameter of the hub member 64 so that they can frictionally engage the outer edges of the hub member 64 when the drive disc 58 is pressed onto the hub member 64 as by tightening of the nut 59 on the end 48a of the bolt shank 48. In this manner, rotation of the shaft 50b is transmitted from the drive disc 58 to the hub member 64 and thus to the reel device 42 on which the strap 16 is connected. Similarly, rotation of the shaft 50a is transmitted from the ratchet wheel 56 to the reel 42.

Figure 4:
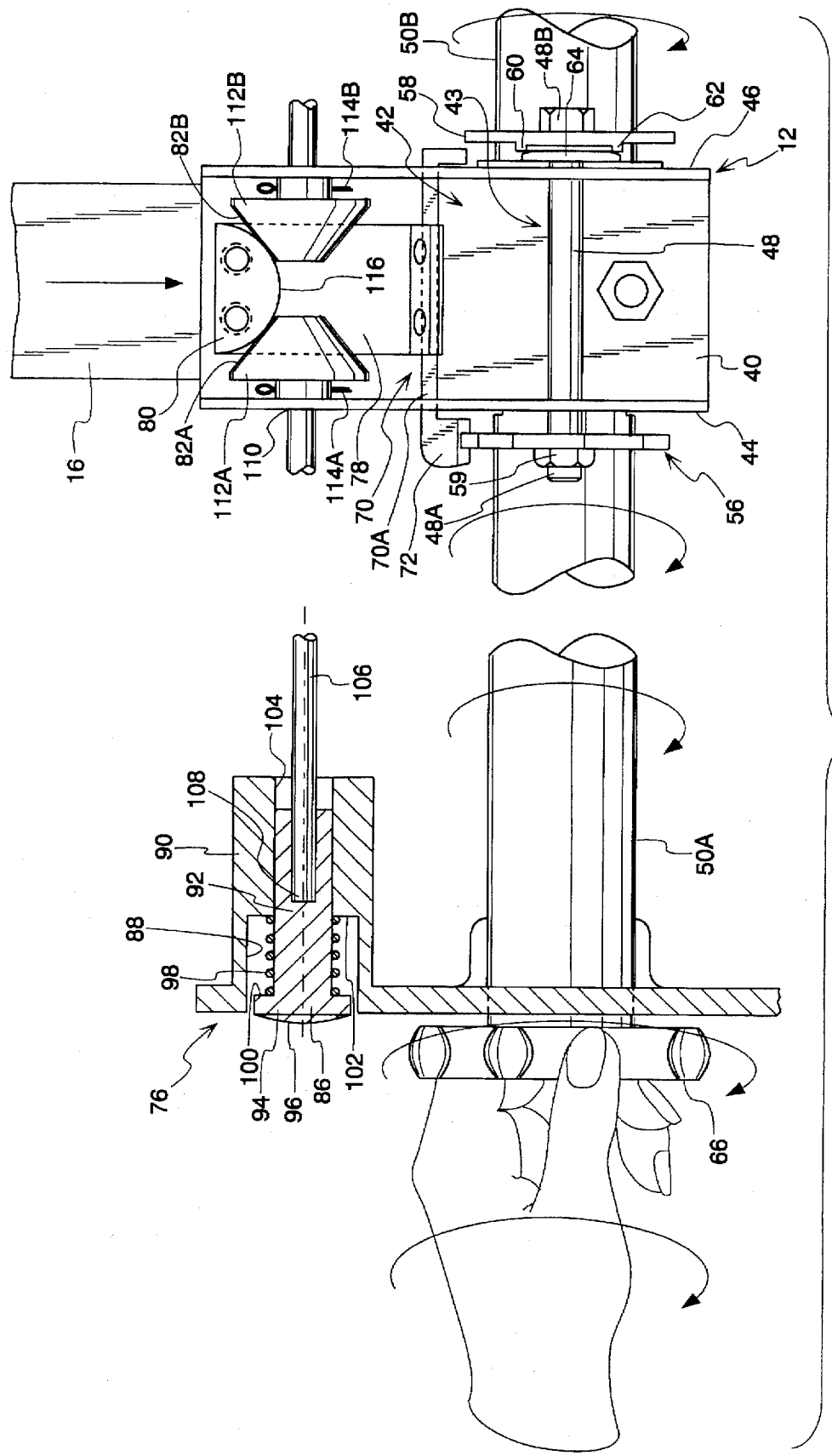
FIG. 4 is a front elevational view of the seat belt mechanism showing a pair of manually rotatable shafts connected to the reel of a retractor with the shafts being rotated to tighten the seat belt.
Figure 5:
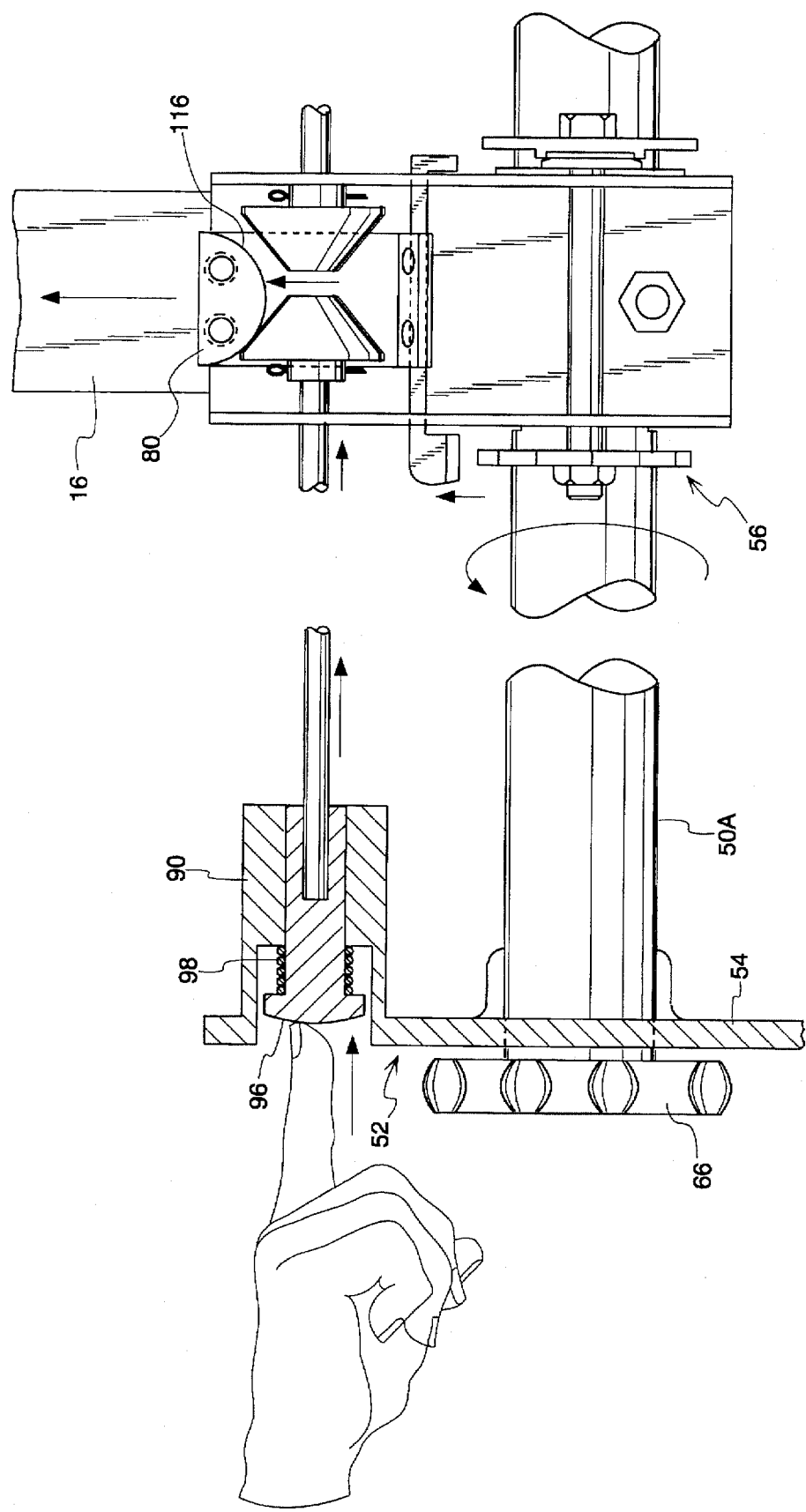
FIG. 5 is a front elevational view, similar to FIG. 4, showing the seat belt mechanism, including the pawl and ratchet of the retractor mechanism with the push button being operated to move the pawl out of engagement with the ratchet to allow protraction of the seat belt.

Rotation of either one of the knobs 66 mounted on the outer ends of the rotatable shafts 50a and 50b in a clockwise direction, as viewed from the left side in FIG. 4, will cause the single strap 16 to be retracted into the retractor 12 onto the reel 42 in the retractor housing 40. Such retraction of the strap 16 will transmit this pulling force to the shoulder straps 30 and 32, by way of the connecting element 38 which can take the form of a conventional splitter plate with hooks 38a and 38b formed therein for connection to looped ends of the shoulder straps 30 and 32, as is known. Hence, clockwise rotation of the control knobs 66 is effective to tighten the shoulder straps 30 and 32 about a child seated in the child seat 18.

Figure 6:
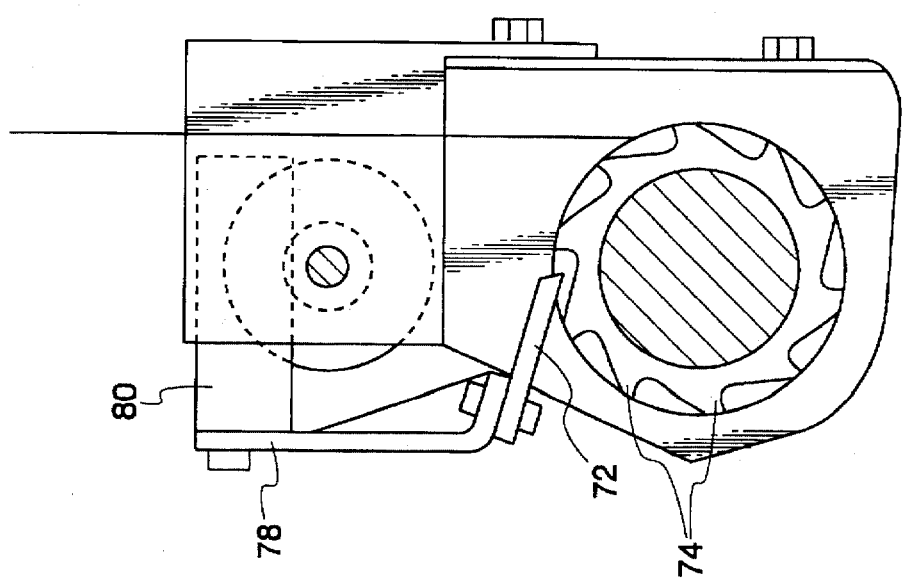
FIG. 6 is a side elevational view of the retractor showing the pawl in locking engagement with the ratchet wheels.

To automatically lock the shoulder straps 30 and 32 in their tightened position, an elongate lock bar 70 is provided which extends laterally through the retractor housing 40 and outside the sides thereof with a pawl portion 72 bent at right angles to the main lateral portion 70a so as to engage and cooperate with the teeth 74 of the ratchet wheel 56. The teeth 74 are configured to allow clockwise rotation to tighten the shoulder straps 30 and 32 about a child, as previously described, and block rotation of the drive shaft 50 in the counter-clockwise direction, and thereby prevent the single strap 16 from paying out from the retractor 12, as best seen in FIGS. 4 and 6. Thus, with the rotatable knobs 66 and shafts 50a and 50b, a user can accurately control the amount of tension exerted by the shoulder straps 30 and 32 on a child in the child seat 18 as rotation of the knob 66 causing the pawl 72 to ratchet past the ratchet teeth 74 will become progressively more difficult as the tension increases. Once the desired tension has been reached, the user merely discontinues turning the control knob 66 in the tightening direction with the ratchet wheel 56 and cooperating pawl 72 maintaining the seat belt locked in the position where the tightening has discontinued regardless of subsequent child movement in the seat 18 which, in prior seat belt mechanisms for child seats could cause the single strap to retract further onto the spool to tighten the shoulder straps further and exert greater tension than desirable on a child.

To release the tension on the shoulder straps 30 and 32, such as when removing a child from the child seat, a manually operable release 76 is provided. The manually operable release 76 includes a pawl actuator having a substantially vertically oriented bracket member 78 which at its lower end is attached to the elongate lock bar 70 and at its upper end is attached to a half cylindrical member 80 having a semi-circular cross-sectional shape and extending forwardly from the upper end of the bracket 78. The member 80 is normally biased downward onto cam seat surfaces 82a and 82b and 84 with the attached pawl 72 in engagement with the ratchet wheel teeth 74 to allow clockwise rotation of the knobs 66 and associated shafts 50, as described earlier.

The release 76 can be provided on either side of the retractor 12 in the mounting members 52 above the control knobs 66. The release 76 is operated to laterally shift the corresponding seat surface 82a or 82b relative to the member 80. The lateral movement of the seat surfaces 82a and 82b relative to the member 80 causes the member 80 and, therefore, the attached bracket member 78 and elongate lock bar 70 including the pawl 72 to be raised with the pawl 72 being raised sufficiently so as to disengage from the ratchet teeth 74 and allow for counter-clockwise rotation of the drive shafts 50a and 50b as caused by protraction of the single strap 16 for loosening of the shoulder straps 30 and 32.

More specifically, the release 76 comprises a push button 86 mounted in an enlarged bore 88 of a block push button housing 90. The push button 86 has a shank portion 92 and an enlarged button head 94 with the button head 94 being biased to an extended position having its top surface 96 only slightly protruding from the plane of the flat plate portion of the mounting member 52.

A compression spring 98 is mounted about the upper portion of the shank 92 extending in the enlarged bore 88 to urge the bottom surface 100 of the button head 94 away from the bottom surface 102 of the enlarged bore 88. The block housing 90 has a smaller diameter bore 104 extending centrally from the enlarged bore 88 through the block housing 90. The diameter of the smaller bore 104 is slightly larger than the shank diameter to allow the shank 92 to extend in the bore 104 and slide in the smaller bore 104 as the release 76 is operated.

A drive rod 106 is attached at one end 108 to the push button shank 92 and at its other end 110 to a cam driver 112, as by cotter pins 114. The cam drivers 112a and 112b are in the form of frusto-conical members with their inclined surfaces defining the ramp seat surfaces 82a and 82b previously described. The semicircular cylindrical member 80 has an arcuate cam surface 116 which can be biased onto the inclined ramp surfaces 82a and 82b of the frusto-conical cam drivers 112a and 112b.

Figure 7:
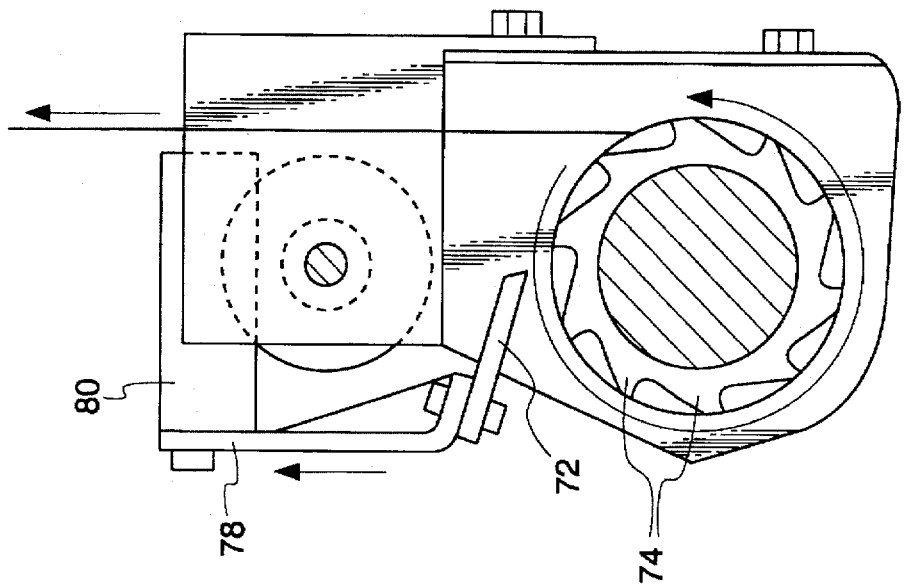
FIG. 7 is a side elevational view similar to FIG. 6 showing the pawl being lifted out of engagement with the ratchet wheel allowing the drive shaft and reel to be rotated for allowing for protraction of the seat belt.

Thus, when the top surface 96 of the push button 86 is pressed, the bottom surface 100 of the button head 94 will be moved towards the bottom 102 of the enlarged bore 88 to compress the spring member 98 and, accordingly, move the drive rod 106 inwardly which causes the frusto-conical cam driver 112 to shift laterally relative to the arcuate surface 116 of the member 80. As the cam driver 112 is shifted laterally relative to the arcuate surface 116, the semi-circular cylindrical member 80 will ride up on the cam driver ramp surface 82 which is being pushed thereagainst. This camming action between the ramp surface 82 and the arcuate surface 116 causes the bracket member 78, attached elongate lock bar 70 and pawl 72 to be lifted with the pawl 72 being lifted out of engagement with the ratchet teeth 74, as best seen in FIGS. 5 and 7.

With the push button camming action described herein, a user can relatively easily and quickly effect tension release on the shoulder straps 30 and 32 when necessary. So, for example, if a child has been placed in the seat 18 and the control knob 66 has been turned excessively in a tightening direction such that the tension on the shoulder straps 30 and 32 is too great on a child, the push button 86 can be operated to effect tension release and allow the shoulder straps 30 and 32 to be loosened off of the child and then readjusted by once again turning the control knob 66 on either side of the child seat 18. Such precise and rapid control of tensioning of the shoulder straps 30 and 32 is a significant improvement over prior seat belt mechanisms used with child seats which either did not allow for tension adjustment or did not allow for precise control of the tension applied. In addition, if the tension is too great, the user need not remove the child from the seat to readjust the shoulder straps 30 and 32 about the child and, instead, can simply operate the manual release 76 to loosen the shoulder straps 30 and 32 about the child and then readjust the belting by way of control knobs 66 to the desired tension level about the child.

While there have been illustrated and described particular embodiments of the present invention, it will be appreciated that numerous changes and modifications will occur to those skilled in the art, and it is intended in the appended claims to cover all those changes and modifications which fall within the true spirit and scope of the present invention.

We claim:

1. A seat belt mechanism for use with a child seat for releasably restraining a child in the child seat, said seat belt mechanism comprising:

a seat belt having attached separable buckle portions;

a seat belt retractor having a reel with the seat belt wound thereon which can be buckled in a locked position with the belt extending about a child in the child seat;

a pawl and ratchet mechanism for blocking rotation of the reel and seat belt protraction to restrain the child in the seat;

a manually rotatable shaft accessible to the operator connected to the pawl and ratchet mechanism to turn the ratchet manually to wind the reel in a rewind direction to tighten the seat belt about the child with the buckle portion latched together and the seat belt in locked position about the buckle; and a manually operable release accessible to the operator and operable to disable the pawl and ratchet mechanism to allow protraction of the belt with rotation of the reel with the belt remaining in its protracted position until the manually rotatable shaft is again turned in the rewind direction by the operator.

2. A seat belt mechanism in accordance with claim 1 wherein the manually operable release includes a push button that is pushed to disable the pawl and ratchet mechanism.

3. A seat belt mechanism in accordance with claim 2 wherein the manually operable release comprises a pawl actuator connected to the pawl of the pawl and ratchet mechanism to lift the pawl from blocking engagement with the ratchet wheel to a release position; and a cam operable by the push button for camming the actuator to its release position.

4. A seat belt mechanism in accordance with claim 3 wherein the reel is mounted on the manually rotatable shaft; and a knob is attached to the end of the shaft for manual rotation of the shaft and reel thereon.

5. A seat belt mechanism in accordance with claim 1 wherein the rotatable shaft includes a pair of rotatable shafts connected to the reel and a pair of knobs are attached at ends of the rotatable shafts to allow rotation of the shafts and reel from opposite sides of the child seat.

6. A seat belt mechanism in accordance with claim 1 wherein the manually operable release comprises a pair of push buttons mounted on opposite sides of the child seat and each operable to disable the pawl and ratchet mechanism from opposite sides of the child seat.

7. A child seat for seating and restraining a child seated therein with a seat belt mechanism, the child seat comprising:

a seat belt having attached separable buckle portions;

a seat body defining a seat with a seat rest and a back rest and a pair of sides on the seat body;

a seat belt mechanism mounted on the seat body and having a reel with the seat belt wound thereon which can be buckled in a locked position with the belt extending about the child and having a pawl and ratchet mechanism connected to the reel for releasably blocking protraction of the seat belt to restrain the child in the child seat;

a manually rotatable shaft accessible to the operator at at least one side of the seat body and mounted in the seat body and connected to the reel to rotate the reel and to tighten the seat belt about the child with the buckle portions latched together and the seat belt in locked position about the child; and a manually operable release accessible to the operator on the seat body and operable to disable the pawl and ratchet mechanism to allow protraction of the seat belt and rotation of the reel with the belt remaining in its protracted position until the manually rotatable shaft is again turned in the rearward direction by the operator.

8. A child seat in accordance with claim 7 wherein a pair of shoulder straps of the seat belt extend along the back rest with lower ends fastened to the seat body, a single strap wound on the reel and connected to the shoulder straps behind the seat rest of the child seat body.

9. A child seat in accordance with claim 7 wherein the rotatable shaft is mounted in the back rest; and a knob is attached to the rotatable shaft adjacent a side of the back rest.

10. A child seat in accordance with claim 9 wherein the reel is mounted to the manually rotatable shaft and the knob is attached to the shaft at the back rest side for manual rotation of the shaft and reel.

11. A child seat in accordance with claim 7 wherein the rotatable shaft includes a pair of rotatable shafts connected to the reel and a pair of knobs are attached at ends of the rotatable shafts to allow rotation of the shafts and reel from opposite sides of the child seat.

12. A child seat in accordance with claim 7 wherein the manually operable release comprises a push button mounted in a side of the back rest and which is pushed inwardly into the back rest to disable the pawl and ratchet mechanism.

13. A child seat in accordance with claim 12 wherein the pawl and ratchet mechanism includes a pawl and a ratchet wheel and the manually operable release comprises a pawl actuator connected to the pawl of the pawl and ratchet mechanism to lift the pawl from blocking engagement with the ratchet wheel to a release position; and a cam operable by the push button for camming the actuator to its release position.

14. A child seat in accordance with claim 7 wherein the manually operable release comprises a pair of push buttons mounted on opposite sides of the child seat and each operable to disable the pawl and ratchet mechanism from opposite sides of the child seat.

15. A seat belt mechanism for use with a child seat for releasably restraining a child in the child seat, the seat belt mechanism comprising:

a seat belt having at least one buckle portion attached thereto adapted to mate and latch with another buckle portion either on the belt or the seat for latching the buckle portions together to lock the seat belt about the child seated on the child seat;

a seat belt retractor having a reel with the seat belt wound thereon;

a reel rotation blocking mechanism including a pawl and ratchet wheel cooperating in a locking position to block rotation of the reel in a seat belt protraction direction to prevent seat belt protraction for restraining the child in the seat;

a manual control accessible on the seat for manually winding the reel and ratchet wheel in a seat belt retraction direction to tighten the buckled seat belt about the seated child; and a manually operated release accessible at the seat for manually shifting the blocking mechanism from the locking position to a non-blocking release position to permit the seat belt to be protracted irrespective of the buckle being latched or unlatched.

* * * * *